(12) United States Patent
Nanda (10) Patent No.: US 7,590,078 B2
(45) Date of Patent: Sep. 15, 2009

(54) DETECTING LEGACY SPOOFING IN REDUCED FUNCTIONALITY USER TERMINALS

(75) Inventor: Sanjiv Nanda, Ramona, CA (US)

(73) Assignee: Qualcomm Incorporated, San Diego, CA (US)

( * ) Notice: Subject to any disclaimer, the term of this patent is extended or adjusted under 35 U.S.C. 154(b) by 251 days.

(21) Appl. No.: 11/243,554

(22) Filed: Oct. 4, 2005

(65) Prior Publication Data

US 2006/0126545 A1 Jun. 15, 2006

Related U.S. Application Data

(60) Provisional application No. 60/616,336, filed on Oct. 5, 2004.

(51) Int. Cl.
*H04Q 7/20* (2006.01)
(52) U.S. Cl. .................. 370/310; 370/311; 370/313; 370/345; 370/346; 370/350; 455/422.1; 455/574; 455/343.1; 455/426.2; 455/426.1
(58) Field of Classification Search ............... 370/310, 370/311, 313, 343, 345, 346, 349, 350; 455/422.1, 455/403, 502, 500, 517, 550.1, 572, 574, 455/343.1, 343.2, 343.3, 343.4, 445, 426.1, 455/426.2, 466
See application file for complete search history.

(56) References Cited

U.S. PATENT DOCUMENTS

| 5,991,635 | A * | 11/1999 | Dent et al. ............... 455/517 |
| 6,477,156 | B1 | 11/2002 | Ala-Laurila et al. ......... 370/331 |
| 7,065,144 | B2 | 6/2006 | Walton et al. |
| 2003/0133469 | A1 | 7/2003 | Brockmann et al. ......... 370/445 |
| 2005/0135318 | A1 | 6/2005 | Walton et al. |
| 2006/0099980 | A1 * | 5/2006 | Nielsen et al. ............. 455/507 |

FOREIGN PATENT DOCUMENTS

WO    WO 02/071650 A1    9/2002

(Continued)

OTHER PUBLICATIONS

Syed Aon Mujtaba, "IEEE P802.11 Wireless LANS TGn Sync Proposal Technical Specification ; IEEE 802.11-04/889r0" Online! (Aug. 8, 2004) pp. 1-135.

(Continued)

*Primary Examiner*—Keith T Ferguson
(74) *Attorney, Agent, or Firm*—Dmitry R. Milikovsky; Charles Eggers (57) ABSTRACT

Backward compatibility may require the use of fields or other indicators that are interpreted by new nodes or stations in a system in a manner different from the way legacy nodes interpret those same fields. In some circumstances, these indicators may be used to "spoof" legacy nodes to behave in certain ways, to allow a next generation protocol to be performed without interference from those legacy nodes. While this practice is may increase communication effectiveness, spoofing may lead to inefficient operation of legacy nodes. Legacy nodes may detect spoofing, including detecting field settings in a legacy portion of a transmitted message, or detecting phase shifts in a message. Once spoofing is detected, a variety of steps may be taken, including determining the duration of the next generation message, entering a low power state for the duration, communicating on alternate channels for the duration, modifying legacy backoff procedures, and others.

35 Claims, 8 Drawing Sheets

FOREIGN PATENT DOCUMENTS

WO      WO 03/077457 A1     9/2003

OTHER PUBLICATIONS

IEEE Wireless LAN Edition, IEEE std 802.11a-1999 (R2003) and its amendments, no date available.

Kowalski, J.: "IEEE P802.11 Wireless LANs, Sharp-NTT Proposal to Task Group n, 11-04-0938-02-000n-proposal-802-11n.doc", Aug. 13, 2004, no date available.

Qualcomm Inc., "IEEE P802.11 Wireless LANs, System Description and Operating Principles for High Throughput Enhancement to 802. 11, Qualcomm Proposal to Task Group n, 11-04-0870-00-000n-802-11-ht-systemdescription-and-operating-principles.doc" , no date available.

Singh, M. et al.: "IEEE P802.11 Wireless LANs, WWiSE Proposal: High throughput extension to the 802.11 Standard, to Task Group n, 11-04-0886-00-000n-wwise-proposal-ht-spec.doc", Aug. 13, 2004.

International Search Report - PCT/US2005/035895 - International Search Authority, European Patent Office, Mar. 3, 2006.

International Preliminary Report of Patentability - PCT/US2005/035895. International Search Authority -The International Bureau of WIPO - Apr. 11, 2007.

Written Opinion - PCT/US2005/035895, International Search Authority - European Patent Office - May 4, 2007.

* cited by examiner

PRIOR ART

DETECTING LEGACY SPOOFING IN REDUCED FUNCTIONALITY USER TERMINALS

CLAIM OF PRIORITY UNDER 35 U.S.C. §119

The present application for patent claims priority to Provisional Application No. 60/616,336 entitled "Method and Apparatus for Ensuring Node Capability In Wireless Networks" filed Oct. 5, 2004, and assigned to the assignee hereof and hereby expressly incorporated by reference herein.

BACKGROUND

1. Field

The present invention relates generally to wireless communications, and more specifically to enhanced block acknowledgement.

2. Background

Wireless communication systems are widely deployed to provide various types of communication such as voice and data. A typical wireless data system, or network, provides multiple users access to one or more shared resources. A system may use a variety of multiple access techniques such as Frequency Division Multiplexing (FDM), Time Division Multiplexing (TDM), Code Division Multiplexing (CDM), and others.

Example wireless networks include cellular-based data systems. The following are several such examples: (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) the high data rate (HDR) system that conforms to the TIA/EIA/IS-856 standard (the IS-856 standard).

Other examples of wireless systems include Wireless Local Area Networks (WLANs) such as the IEEE 802.11 standards (i.e. 802.11 (a), (b), or (g)). Improvements over these networks may be achieved in deploying a Multiple Input Multiple Output (MIMO) WLAN comprising Orthogonal Frequency Division Multiplexing (OFDM) modulation techniques. IEEE 802.11(e) has been introduced to improve upon some of the shortcomings of previous 802.11 standards.

As wireless system designs have advanced, higher data rates have become available. Higher data rates have opened up the possibility of advanced applications, among which are voice, video, fast data transfer, and various other applications. However, various applications may have differing requirements for their respective data transfer. Many types of data may have latency and throughput requirements, or need some Quality of Service (QoS) guarantee. Without resource management, the capacity of a system may be reduced, and the system may not operate efficiently.

Medium Access Control (MAC) protocols are commonly used to allocate a shared communication resource between a number of users. MAC protocols commonly interface higher layers to the physical layer used to transmit and receive data. To benefit from an increase in data rates, a MAC protocol must be designed to utilize the shared resource efficiently.

As new MAC protocols are developed, there will continue to be legacy user terminals. MAC protocols may be designed to interoperate with legacy terminals. In order to perform such interoperation, techniques may be deployed to cause legacy terminals to perform in certain ways to allow access or communication on a shared resource by terminals communicating according to the newer protocols. Such techniques, which may trick legacy terminals into taking such steps may be referred to as "spoofing". In some circumstances, spoofing may allow a newer communication protocol to operate, and there may be benefits associated therewith, yet a spoofed user terminal may suffer undesirable consequences. There is therefore a need in the art for detecting legacy spoofing in legacy or reduced functionality user terminals.

SUMMARY

Embodiments disclosed herein address the need in the art for detecting legacy spoofing in reduced functionality user terminals.

According to one aspect, an apparatus is described which includes a receiver receiving a message, a first part of the message transmitted in a first communication format, the message comprising an alternate format indicator when a second communication format is used to transmit a second part of the message, and a processor detecting the alternate format indicator, determining a duration for transmission of the second part of the message when the alternate format indicator is detected, and directing the receiver to enter a low power state for the determined duration when the alternate format indicator is detected.

According to another aspect, an apparatus is described which includes a receiver receiving a message, a first part of the message transmitted in a first communication format, the message comprising an alternate format indicator when a second communication format is used to transmit a second part of the message, and means for detecting the alternate format indicator.

According to another aspect, a method is disclosed for receiving a message, a first part of the message transmitted in a first communication format, the message comprising an alternate format indicator when a second communication format is used to transmit a second part of the message, detecting the alternate format indicator, determining a duration for transmission of the second part of the message when the alternate format indicator is detected, and entering a low power state for the determined duration when the alternate format indicator is detected.

According to another aspect, a method is disclosed for receiving a message, the message comprising a first part transmitted at a first phase and a second part transmitted at a second phase, the second phase different than the first phase, detecting a phase difference between the first part and the second part, and entering a low power state when the phase difference is detected.

According to another aspect, a method is disclosed for receiving a message, a first part of the message transmitted in a first communication format, the message comprising one or more fields for setting parameters of the first communication format, decoding the one or more fields, and entering a low power state when a decoded field is set to a value unsupported by the first communication format.

According to another aspect, computer readable media is disclosed, operable to perform receiving a message, a first part of the message transmitted in a first communication format, the message comprising an alternate format indicator when a second communication format is used to transmit a second part of the message, detecting the alternate format indicator, determining a duration for transmission of the second part of the message when the alternate format indicator is detected, and entering a low power state for the determined duration when the alternate format indicator is detected.

Various other aspects and embodiments are also disclosed.

DETAILED DESCRIPTION

As communication protocols evolve, and next generation standards are defined, backward compatibility may require the use of fields or other indicators that are interpreted by new nodes or stations in a system in a manner different from the way legacy nodes interpret those same fields. In some circumstances, these indicators may be used deliberately to direct legacy nodes to behave in certain ways. Such use may be referred to as spoofing, because the next generation standard may want to "trick" legacy nodes to allow the next generation protocol to be performed without interference from those legacy nodes. While this practice is generally deployed to allow increased communication effectiveness, including higher throughput, lower power, higher capacity, etc., spoofing may lead to inefficient operation of legacy nodes.

In many cases, legacy nodes may continue to be produced even while it becomes known what methods will be used to spoof legacy nodes. This occurs, for example, if the next generation standard imposes high complexity and cost requirements for compatible nodes. In this case, it may be desirable for legacy nodes to be aware of the manner in which the next generation standard defines interpretation of the legacy fields. A "smart" legacy node may detect spoofing and take appropriate steps to reduce undesirable effects spoofing may cause. Thus, smart legacy nodes follow the new interpretations of the legacy fields and may operate more efficiently. Such smart legacy nodes may be referred to herein as reduced functionality user terminals. Note that, a user terminal may be deployed to support the entire next generation, but may also provide for a reduced functionality mode, as described further below.

An example embodiment is described below using the 802.11n standard, which is to be designed to be compatible with existing (or legacy) standards 802.11a/g (802.11-2003). The embodiments described are equally applicable for multiple standards and are not restricted to 802.11n and 802.11a/g compatibility. Furthermore, while the embodiments provided below may use the phrase "backward compatibility," the embodiments are equally applicable to any sort of compatibility among nodes of multiple standards or multiple versions of standards or any combination thereof.

As used herein, in order to differentiate a standard from an earlier standard with which backward compatibility is desired, the term "high throughput" is used in reference to the newer system, or a system defining a different class of operation from legacy systems. Again, the terms "legacy" or "reduced functionality" may be used to describe user terminals performing in a backward (or otherwise) compatible mode. As stated above, a reduced functionality or legacy user terminal may alternately be configured to perform full functionality in alternate modes, as will be obvious to one of ordinary skill in the art.

Therefore, example embodiments of legacy terminals incorporating one or more aspects described herein may include modern devices equipped to detect one or more aspects of a high throughput system (or any other alternate communication standard) and respond according, without necessarily supporting all the features of the system.

Example high throughput embodiments are disclosed herein that support, among other example embodiments, highly efficient operation in conjunction with very high bit rate physical layers for a wireless LAN (or similar applications that use newly emerging transmission technologies). The example high throughput WLAN supports bit rates in excess of 100 Mbps (million bits per second) in bandwidths of 20 MHz. Various alternate WLANs are also supported.

Various example embodiments preserve the simplicity and robustness of the distributed coordination operation of legacy WLAN systems, examples of which are found in 802.11 (a-e). The advantages of the various embodiments may be achieved while maintaining backward compatibility with such legacy systems. (Note that, in the description below, 802.11 systems may be described as example legacy systems. Those of skill in the art will recognize that the improvements are also compatible with alternate systems and standards.)

An example WLAN may comprise a sub-network protocol stack. The sub-network protocol stack may support high data rate, high bandwidth physical layer transport mechanisms in general, including, but not limited to, those based on OFDM modulation, single carrier modulation techniques, systems using multiple transmit and multiple receive antennas (Multiple Input Multiple Output (MIMO) systems, including Multiple Input Single Output (MISO) systems) for very high bandwidth efficiency operation, systems using multiple transmit and receive antennas in conjunction with spatial multiplexing techniques to transmit data to or from multiple user terminals during the same time interval, and systems using code division multiple access (CDMA) techniques to allow transmissions for multiple users simultaneously. Alternate examples include Single Input Multiple Output (SIMO) and Single Input Single Output (SISO) systems.

One or more exemplary embodiments described herein are set forth in the context of a wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps. Method steps can be interchanged without departing from the scope of the present invention. The word "exemplary" is used herein to mean "serving as an example, instance, or illustration." Any embodiment described herein as "exemplary" is not necessarily to be construed as preferred or advantageous over other embodiments.

Figure 1:
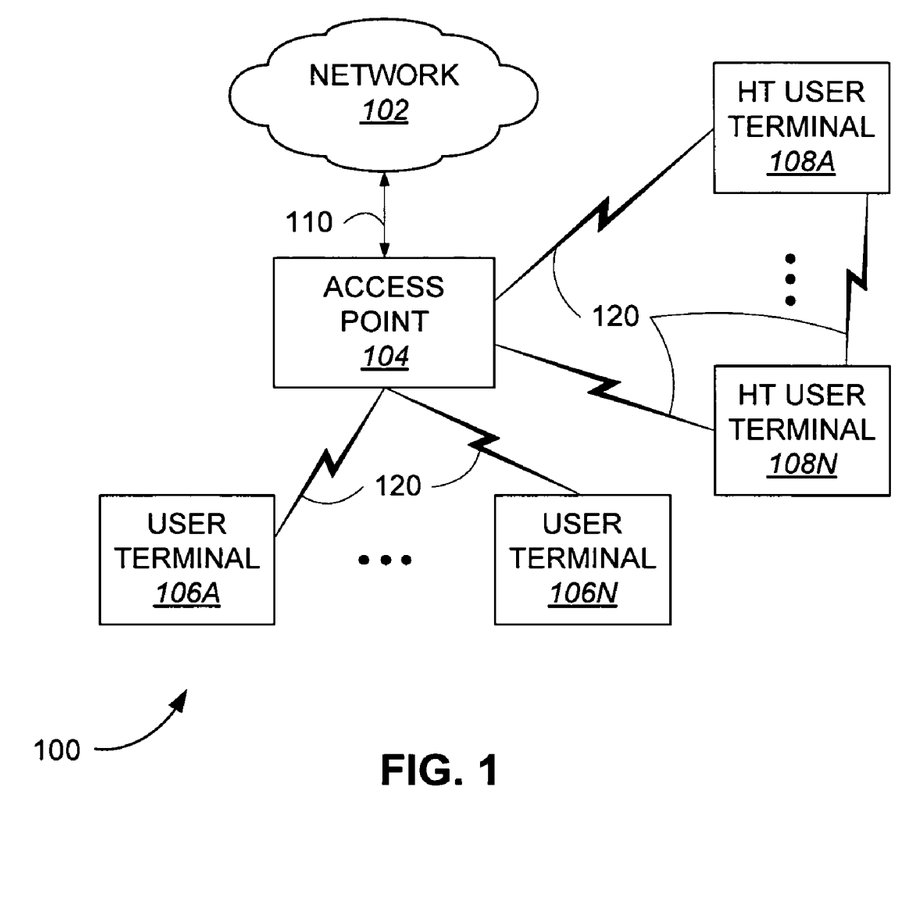
FIG. 1 depicts a general block diagram of a wireless communication system capable of supporting a number of users.

FIG. 1 depicts example embodiments of system 100, comprising an Access Point (AP) 104 connected to one or more User Terminals (UTs) 106A-N. UTs 106 may be true legacy stations, or reduced functionality user terminals, (i.e. smart legacy terminals) or any combination. In accordance with 802.11 terminology, in this document, the AP and the UTs are also referred to as stations, STAs or nodes. The techniques and embodiments described herein are also applicable to other types of systems (examples include the cellular standards detailed above). As used herein, the term base station can be used interchangeably with the term access point. The term user terminal can be used interchangeably with the terms user equipment (UE), subscriber unit, subscriber station, access terminal, remote terminal, mobile station, or other corresponding terms known in the art. The term mobile station encompasses fixed wireless applications.

Note also that user terminals 106 may communicate directly with one another. The Direct Link Protocol (DLP), introduced by 802.11(e), allows a STA to forward frames directly to another destination STA within a Basic Service Set (BSS) (controlled by the same AP). In various embodiments, as known in the art, an access point is not required. For example, an Independent BSS (IBSS) may be formed with any combination of STAs. Ad hoc networks of user terminals may be formed which communicate with each other via wireless network 120 using any of the myriad communication formats known in the art.

The AP and the UTs communicate via Wireless Local Area Network (WLAN) 120. In the example embodiment, WLAN 120 is a high speed MIMO OFDM system. However, WLAN 120 may be any wireless LAN. Optionally, access point 104 communicates with any number of external devices or processes via network 102. Network 102 may be the Internet, an intranet, or any other wired, wireless, or optical network. Connection 110 carries the physical layer signals from the network to the access point 104. Devices or processes may be connected to network 102 or as UTs (or via connections therewith) on WLAN 120. Examples of devices that may be connected to either network 102 or WLAN 120 include phones, Personal Digital Assistants (PDAs), computers of various types (laptops, personal computers, workstations, terminals of any type), video devices such as cameras, camcorders, webcams, and virtually any other type of data device. Processes may include voice, video, data communications, etc. Various data streams may have varying transmission requirements, which may be accommodated by using varying Quality of Service (QoS) techniques.

Also shown in FIG. 1 are connections on WLAN 120 to High Throughput (HT) user terminals 108 A-N. HT user terminals 108 are used to signify terminals operating in accordance with a next generation standard, referred to for clarity herein as a high throughput system. Note that HT user terminals 108 may communicate with AP 104 or directly with each other, as shown. The connections shown between HT UTs 108 may operate according to a high throughput (or non-legacy) format, and thus the connection is not shown with UTs 106. While not shown, it will be clear to one of ordinary skill in the art that HT UTs 108 may also communicate directly with UTs 106 according to legacy protocols.

System 100 may be deployed with a centralized AP 104. All UTs 106 and 108 communicate with the AP in one example embodiment. In an alternate embodiment, direct peer-to-peer communication between two UTs may be accommodated, with modifications to the system, as will be apparent to those of skill in the art, examples of which are illustrated below. Any station may be set up as a designated AP in embodiments supporting designated access points. Access may be managed by an AP, or ad hoc (i.e. contention based).

In one embodiment, AP 104 provides Ethernet adaptation. In this case, an IP router may be deployed in addition to the AP to provide connection to network 102 (details not shown). Ethernet frames may be transferred between the router and the UTs 106 over the WLAN sub-network (detailed below). Ethernet adaptation and connectivity are well known in the art.

In an alternate embodiment, the AP 104 provides IP Adaptation. In this case, the AP acts as a gateway router for the set of connected UTs (details not shown). In this case, IP datagrams may be routed by the AP 104 to and from the UTs 106. IP adaptation and connectivity are well known in the art.

Figure 2:
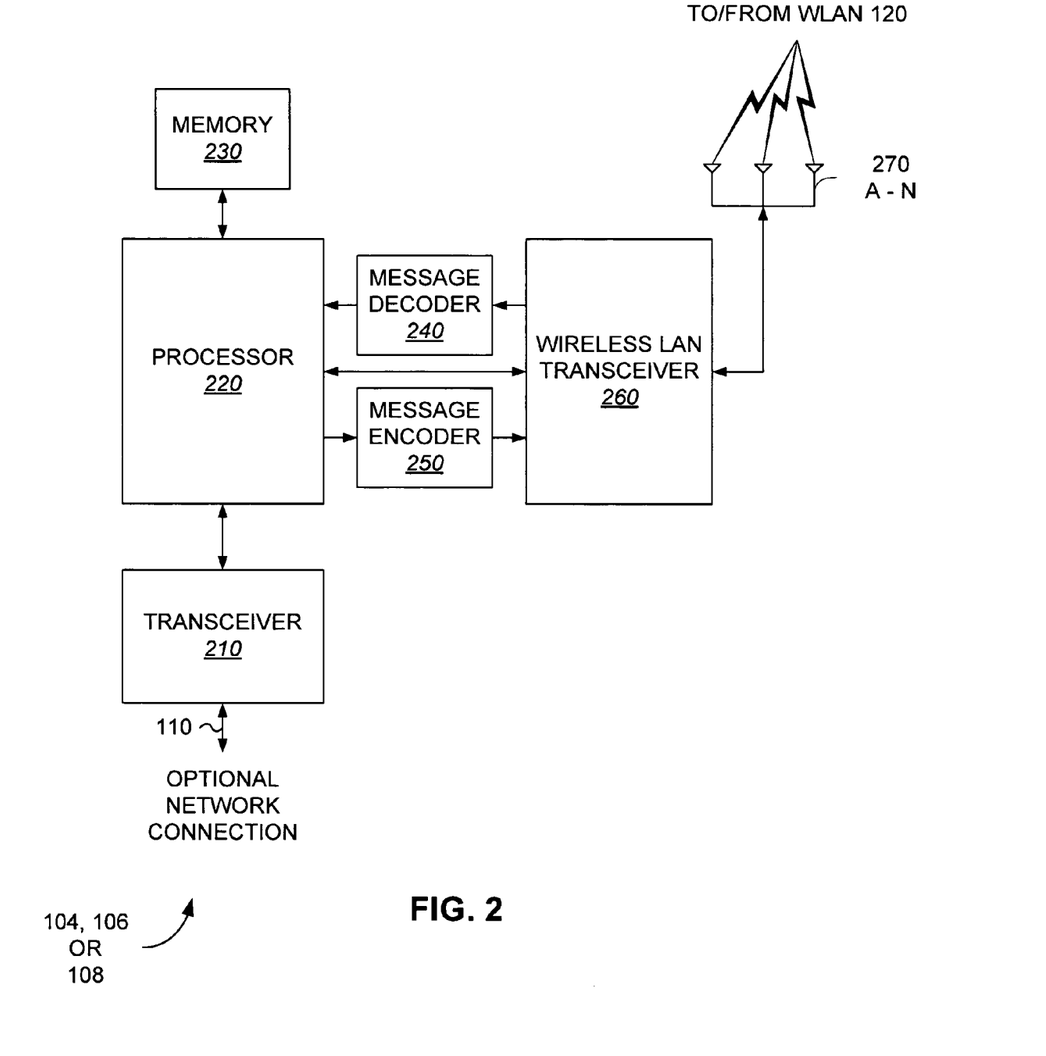
FIG. 2 depicts example embodiments of a wireless communication device.

FIG. 2 depicts an example embodiment of a wireless communication device, which may be configured as an access point 104 or user terminal 106 or 108. A wireless communication device is an example STA, suitable for deployment in system 100. An access point 104 configuration is shown in FIG. 2. Transceiver 210 receives and transmits on connection 110 according to the physical layer requirements of network 102. Data from or to devices or applications connected to network 102 are delivered to processor 220. These data may be referred to herein as flows. Flows may have different characteristics and may require different processing based on the type of application associated with the flow. For example, video or voice may be characterized as low-latency flows (video generally having higher throughput requirements than voice). Many data applications are less sensitive to latency, but may have higher data integrity requirements (i.e., voice may be tolerant of some packet loss, file transfer is generally intolerant of packet loss).

Processor 220 may include a Media Access Control (MAC) processing unit (details not shown) that receives flows and processes them for transmission on the physical layer. Processor 220 may also receive physical layer data and process the data to form packets for outgoing flows. 802.11 WLAN related control and signaling may also be communicated between the AP and the UTs. MAC Protocol Data Units (MPDUs) encapsulated in Physical layer (PHY) Protocol Data Units (PPDUs) are delivered to and received from wireless LAN transceiver 260. An MPDU is also referred to as a frame. When a single MPDU is encapsulated in a single PPDU, sometimes the PPDU may be referred to as a frame. Alternate embodiments may employ any conversion technique, and terminology may vary in alternate embodiments. Feedback corresponding to the various MAC IDs may be returned from the physical layer processor 220 for various purposes. Feedback may comprise any physical layer information, including supportable rates for channels (including multicast as well as unicast channels), modulation format, and various other parameters.

Processor 220 may be a general-purpose microprocessor, a digital signal processor (DSP), or a special-purpose processor. Processor 220 may be connected with special-purpose hardware to assist in various tasks (details not shown). Various applications may be run on externally connected processors, such as an externally connected computer or over a network connection, may run on an additional processor within wireless communication device 104, 106, or 108 (not shown), or may run on processor 220 itself. Processor 220 is shown connected with memory 230, which may be used for storing data as well as instructions for performing the various procedures and methods described herein. Those of skill in the art will recognize that memory 230 may be comprised of one or more memory components of various types, that may be embedded in whole or in part within processor 220. In addition to storing instructions and data for performing functions described herein, memory 230 may also be used for storing data associated with various queues.

Wireless LAN transceiver 260 may be any type of transceiver. In an example embodiment, wireless LAN transceiver 260 is an OFDM transceiver, which may be operated with a MIMO or MISO interface. OFDM, MIMO, and MISO are known to those of skill in the art. Various example OFDM, MIMO and MISO transceivers are detailed in co-pending U.S. patent application Ser. No. 10/650,295, entitled "FREQUENCY-INDEPENDENT SPATIAL-PROCESSING FOR WIDEBAND MISO AND MIMO SYSTEMS", filed Aug. 27, 2003, and assigned to the assignee of the present invention. Alternate embodiments may include SIMO or SISO systems.

Wireless LAN transceiver 260 is shown connected with antennas 270 A-N. Any number of antennas may be supported in various embodiments. Antennas 270 may be used to transmit and receive on WLAN 120.

Wireless LAN transceiver 260 may comprise a spatial processor in communication with each of the one or more antennas 270. The spatial processor may process the data for transmission independently for each antenna or jointly process the received signals on all antennas. Examples of the independent processing may be based on channel estimates, feedback from the UT, channel inversion, or a variety of other techniques known in the art. The processing is performed using any of a variety of spatial processing techniques. Various transceivers of this type may transmit utilizing beam forming, beam steering, eigen-steering, or other spatial techniques to increase throughput to and from a given user terminal. In an example embodiment, in which OFDM symbols are transmitted, the spatial processor may comprise sub-spatial processors for processing each of the OFDM subchannels, or bins.

In an example system, the AP (or any STA, such as a UT) may have N antennas, and an example UT may have M antennas. There are thus M×N paths between the antennas of the AP and the UT. A variety of spatial techniques for improving throughput using these multiple paths are known in the art. In a Space Time Transmit Diversity (STTD) system (also referred to herein as "diversity"), transmission data is formatted and encoded and sent across all the antennas as a single stream of data. With M transmit antennas and N receive antennas there may be MIN (M, N) independent channels that may be formed. Spatial multiplexing exploits these independent paths and may transmit different data on each of the independent paths, to increase the transmission rate.

Various techniques are known for learning or adapting to the characteristics of the channel between the AP and a UT. Unique pilots may be transmitted from each transmit antenna. In this case, the pilots are received at each receive antenna and measured. Channel state information feedback may then be returned to the transmitting device for use in transmission. Eigen decomposition of the measured channel matrix may be performed to determine the channel eigenmodes. An alternate technique, to avoid eigen decomposition of the channel matrix at the receiver, is to use eigen-steering of the pilot and data to simplify spatial processing at the receiver.

Thus, depending on the current channel conditions, varying data rates may be available for transmission to various user terminals throughout the system. In particular, the specific link between the AP and each UT may be higher performance than a multicast or broadcast link that may be shared from the AP to more than one UT. The wireless LAN transceiver 270 may determine the supportable rate based on whichever spatial processing is being used for the physical link between the AP and the UT. This information may be fed back for use in further processing, e.g. at the MAC layer.

For illustration purposes, message decoder 240 is deployed between wireless LAN transceiver 260 and processor 220. In an example embodiment, the function of message decoder 240 may be performed within processor 220, wireless LAN transceiver 260, other circuitry, or a combination thereof. Message decoder 240 is suitable for decoding any number of control data or signaling messages for performing communications within the system. In one example, message decoder 240 is suitable for receiving and decoding PPDU fields, as described below. Various other messages may be decoded using any number of message decoding techniques well known in the art. Message encoder 250 may be similarly deployed between processor 220 and wireless LAN transceiver 260 (and may also be performed in whole or in part in processor 220, wireless LAN transceiver 260, other circuitry, or a combination thereof), and may perform encoding of messages such as those just described. Techniques for message encoding and decoding are well known to those of ordinary skill in the art.

Figure 3:
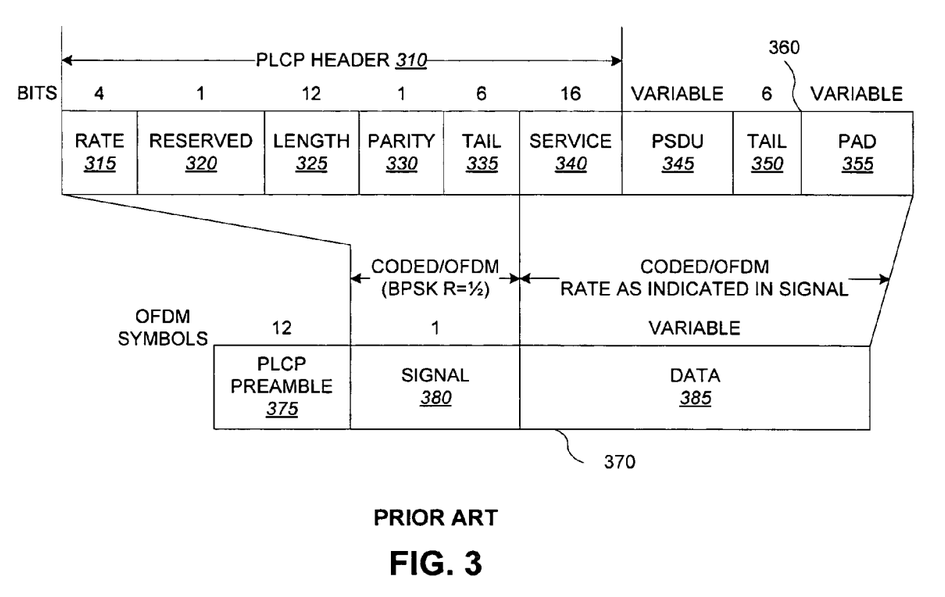
FIG. 3 depicts a legacy 802.11 PPDU.

FIG. 3 depicts a legacy 802.11 a/g PPDU 370, comprising a PLCP preamble 375 (12 OFDM symbols), a PLCP header 310, a variable length PSDU 345, a 6-bit tail 350, and variable length pad 355. A portion 360 of PPDU 370 comprises a SIGNAL field (1 OFDM symbol) transmitted using BPSK at rate=½, and a variable length data field 385, transmitted with the modulation format and rate indicated in SIGNAL 380. PLCP header 310 comprises SIGNAL 380 and 16-bit Service field 340 (which is included in DATA 385, and transmitted according to its format). SIGNAL field 380 comprises Rate 315 (4 bits), reserved field 320 (1 bit), Length 325 (12 bits), Parity bit 330, and Tail 335 (6 bits). The SIGNAL field is transmitted using the most robust modulation and coding format for the coded OFDM symbols. The RATE field within the SIGNAL field indicates the modulation and coding format for the DATA portion of the PPDU. As defined in 802.11-2003, bit 4 of the 4-bit RATE field is unused (always set to 0).

For 802.11n, backward compatible PPDU types are introduced. In an example embodiment, extended SIGNAL fields are introduced in the legacy PLCP Header to be backward compatible with the SIGNAL field 380 of legacy 802.11. Unused values of the RATE field 315 in legacy SIGNAL field 380 are set to define new PPDU types. This example high throughput system is disclosed in related co-pending U.S. patent application Ser. No. 10/964,330, entitled "HIGH SPEED MEDIA ACCESS CONTROL WITH LEGACY SYSTEM INTEROPERABILITY", filed Oct. 13, 2004, assigned to the assignee of the present invention and incorporated by reference herein (hereinafter the '330 application).

In the '330 application, several new PPDU types are introduced. For backward compatibility with legacy STAs, the RATE field in the SIGNAL field of the PLCP Header is modified to a RATE/Type field. Unused values of RATE are designated as PPDU Type. The PPDU Type also indicates the presence and length of a SIGNAL field extension designated SIGNAL2. These values of the RATE/Type field are undefined for legacy STAs. Therefore, legacy STAs may abandon decoding of the PPDU after successfully decoding the SIGNAL1 field and finding an undefined value in the RATE field. Alternately, the Reserved bit in the legacy SIGNAL field may be set to '1' to indicate a MIMO OFDM transmission to a new class STA. Receiving STAs may ignore the Reserved bit and continue to attempt to decode the SIGNAL field and the remaining transmission. A HT receiver is able to determine the length of the SIGNAL2 field based on the PPDU Type.

There are a variety of ways to spoof legacy terminals, thus, preventing those terminals from interfering with communication on a shared medium. This allows an alternate system, such as a high throughput system, to operate on the shared medium without interference from those legacy terminals. Specific examples of techniques for spoofing may be found in several current proposals from industry groups, the proposals known as TGnSync, WWiSE and Sharp. These proposals may be found in the following documents, respectively: Tgn-Sync proposal to Task Group n, document 04/889r0 (11-04-0889-00-000n-tgnsync-porposal-technical-specification-.doc); WWiSE Proposal to Task Group n, document 04/886r0 (11-04-0886-00-000n-wwise-proposal-ht-spec.doc); and Sharp-NTT Proposal to Task Group n, document 04/938r2 (11-04-0938-02-00n-proposal-802-11n.doc). Other techniques have also been proposed and are included in the QUALCOMM proposal to Task group n, document 04/870r0 (11-04-0870-00-000n-802-11-ht-system-description-and-operating-principles.doc). Each of these proposals is expressly incorporated by reference herein.

Figure 4:
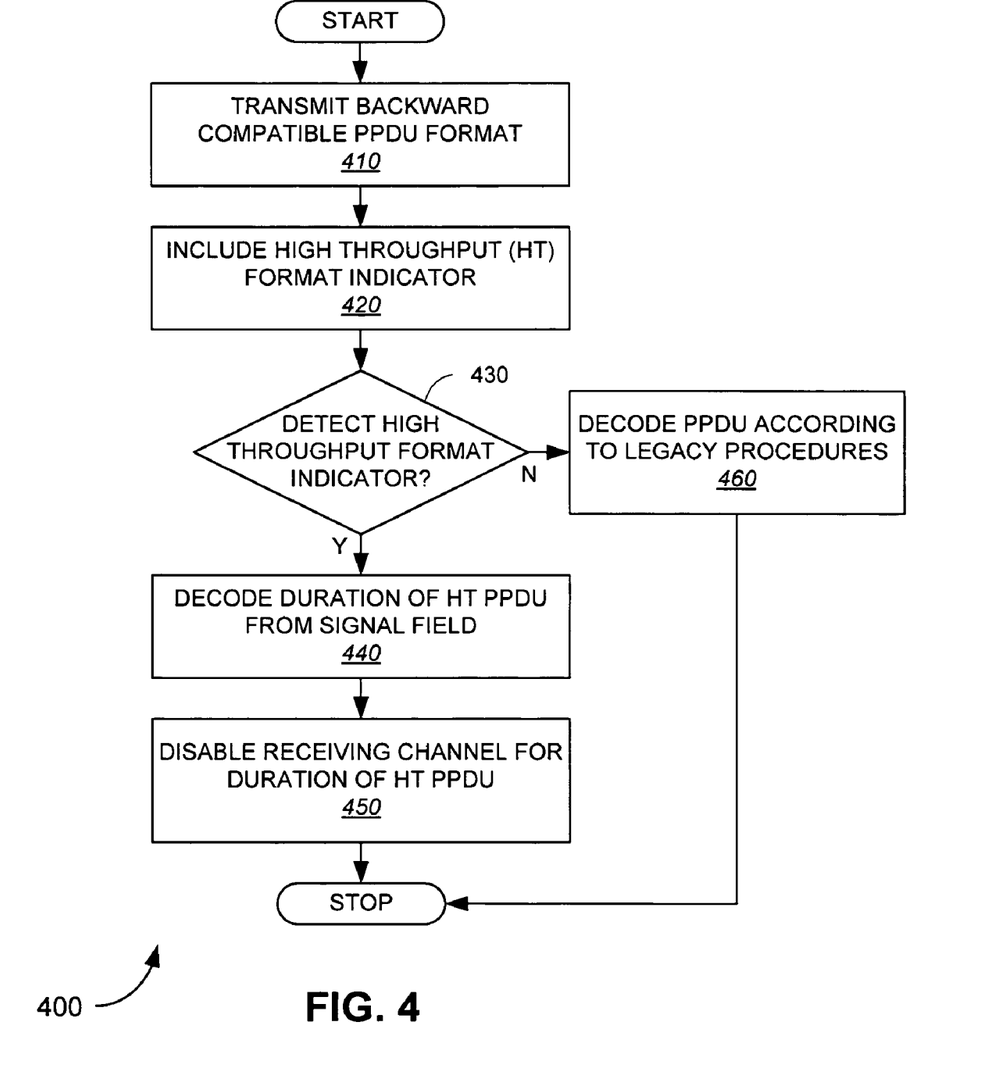
FIG. 4 depicts example embodiments of a method for detecting legacy spoofing.

FIG. 4 depicts example embodiments of a method 400 for detecting legacy spoofing in reduced functionality user terminals. This generalized embodiment illustrates several aspects, more detailed embodiments of which are described further below. In general, spoofing is carried out in order to allow interoperability with legacy terminals and high throughput terminals using the same shared medium. As stated above, by spoofing the legacy terminals and causing them to refrain from interfering with the shared medium for a period of time, the shared medium can be used for that duration with modulation formats and/or other system parameters that are not supported by legacy terminals. Thus, enhanced communication, such as higher throughput, lower power, increased capacity, etc., may be realized in the shared medium. Legacy terminals that are not "smart", as described above, may be spoofed using various techniques, examples of which are detailed further below.

However, there may be drawbacks to the spoofed terminal that may be overcome using various aspects detailed herein. For example, a reduced functionality user terminal that is aware of spoofing techniques may decide to conserve power during the period of time for which spoofing is attempted. This smart user terminal cooperates with the spoofing attempt, but is not required to suffer the deleterious effects. Various techniques for entering one or more low power states are well known in the art, and any such technique may used by a smart legacy terminal once spoofing is detected. Thus, detecting spoofing may be useful for such reduced functionality user terminals. In addition to power savings (i.e. by going to sleep for a duration when spoofing is detected) a user terminal may take other steps when spoofing is detected.

For example, a legacy terminal, having detected spoofing, knows that the channel has been used for various other terminals and may decide to take alternate actions with respect to priority for accessing the shared medium. For example, fairness strategies have been developed to allow user terminals to share using techniques such as backoffs (e.g. DFS, set forth in the 802.11 standard) and the like to allow each terminal to have access to the shared medium. A spoofed terminal may use spoof detection, among other factors, to determine whether to change its priority, modify backoff procedures, and the like, to afford fair access to the shared medium by legacy user terminals. For example, 802.11 MAC procedures specify procedures that a terminal must follow after a failed reception. These procedures may be modified if the terminal is aware that it is being spoofed. Moreover, a spoofed handheld Voice over IP (VoIP) terminal may use the spoofed period to conduct neighbor AP search and measurement to prepare for voice call handoff. Those of skill in the art will recognize various other actions that may be performed once spoofing is detected, as described herein.

The example embodiment of method 400 begins at 410, where a backward compatible PPDU format is transmitted. As described in the above referenced proposed standards, a newer specification may include PPDUs which are transmitted in a manner by which legacy terminals may receive and decode at least a part of the PPDU. For example, a PPDU with a PLCP header 310, such as described above, may be transmitted. A PPDU may be modified in one or more ways, as detailed above in the '330 application. Those of skill in the art will recognize myriad other ways to transmit PPDUs with one or more sections compatible with legacy systems.

At 420, a high throughput format indicator (or an indicator of any type of communication standard for which compatibility with legacy terminals is desired) may be included. Thus, if spoofing is desired, then an at least partially backward compatible PPDU format is transmitted at 410, while an indicator is used at 420 which may be decodable by high throughput devices in order to indicate to HT devices the high throughput format of the PPDU transmission. In some instances, the backward compatible PPDU format may be transmitted to or from a legacy station, and thus, a high throughput indicator will not be included for those PPDUs The indicator is included when legacy terminals are to be spoofed, and non-legacy terminals (i.e. HT terminals) are to perform some alternate steps in response to a transmitted PPDU.

At 430, the reduced functionality user terminal attempts to detect whether a high throughput indicator was transmitted. If so, proceed to 440. If not, at 460, a legacy PPDU was transmitted. The user terminal will proceed to decode the PPDU according to legacy procedures. Then the process may stop.

At 440, if the high throughput indicator has been detected, then spoofing has been detected. The user terminal will refrain from interfering with the channel for the duration of the PPDU as required by the legacy protocol. During this duration, a user terminal may take one of a variety of steps, examples of which have been set forth above. Several example techniques for detecting the duration are described further below.

At 450, in this example, upon detection of the high throughput indicator, the user terminal disables using the channel for the duration of the high throughput PPDU. Therefore, in this example, the user terminal may enter a low power state to conserve battery life. Varying levels of low power or sleep states may be deployed, in various embodiments, such as described above, and may be carried out by a user terminal when spoofing has been detected.

Various spoofing techniques, examples of which are given in the example proposals described above, may use the Length and Rate Field of the SIGNAL Field, to spoof legacy STAs. As discussed above, a legacy node (unless it detects spoofing) receives the SIGNAL Field and starts to decode the rest of the packet in the specified rate and will continue to do so until the end of Length/Rate time.

In these embodiments, spoofing uses the characteristic of the Length and Rate Fields, so that the (Length/Rate)–(EIFS–DIFS) is equivalent to the intended NAV Duration. By setting the RATE field to a value that can be decoded by all legacy STAs, a legacy node that is spoofed by these two fields will continue reception for that (Length /Rate)–(EIFS–DIFS) time, preventing it to start transmission during that period. In an example embodiment, such as described in various high throughput embodiments proposed for 802.11n, the rate may be set to 6 Mbps and the Length field may be computed in such a manner to cover the length of the high throughput PPDU. In this way, transmission control may be achieved without altering the mechanism of the legacy nodes.

Using this technique, there may be a number of combinations of Length and Rate to achieve the same "Length/Rate", so a spoof initiator may be given the liberty to choose among the combinations. The maximum spoof duration that an initiator may set, in this example, is determined by the maximum length of the packet and the minimum rate that the original protocol can withstand.

In an example 802.11 embodiment, the signal energy level may go down during the reception of the packet, because the actual packet length may be less than the spoofed length. But, according to the IEEE 802.11a MAC Specification (See IEEE Std 802.11a-1999, page 37, FIG. 125), legacy nodes honor the Length and Rate field, and remain inactive on the channel for the Length/Rate.

In an alternate embodiment, employing in example HT system, such as 802.11n, the spoofed SIGNAL field is followed by the Extension SIGNAL field that can be decoded by 802.11n STAs (i.e. HT UTs). The Extension SIGNAL Field will contain the true Rate and the true Length that 802.11n nodes will use. However, after decoding the legacy SIGNAL Field, an 802.11n node will not know whether the SIGNAL Field is spoofed and is followed by an Extension SIGNAL Field (sent at unified rate), or the packet is a legacy "unspoofed" packet and is followed by a MAC Header coded at a rate specified in the SIGNAL Field. Some indicator needs to be defined to allow 802.11n STAs to detect the presence of an Extension SIGNAL field.

Figure 5:
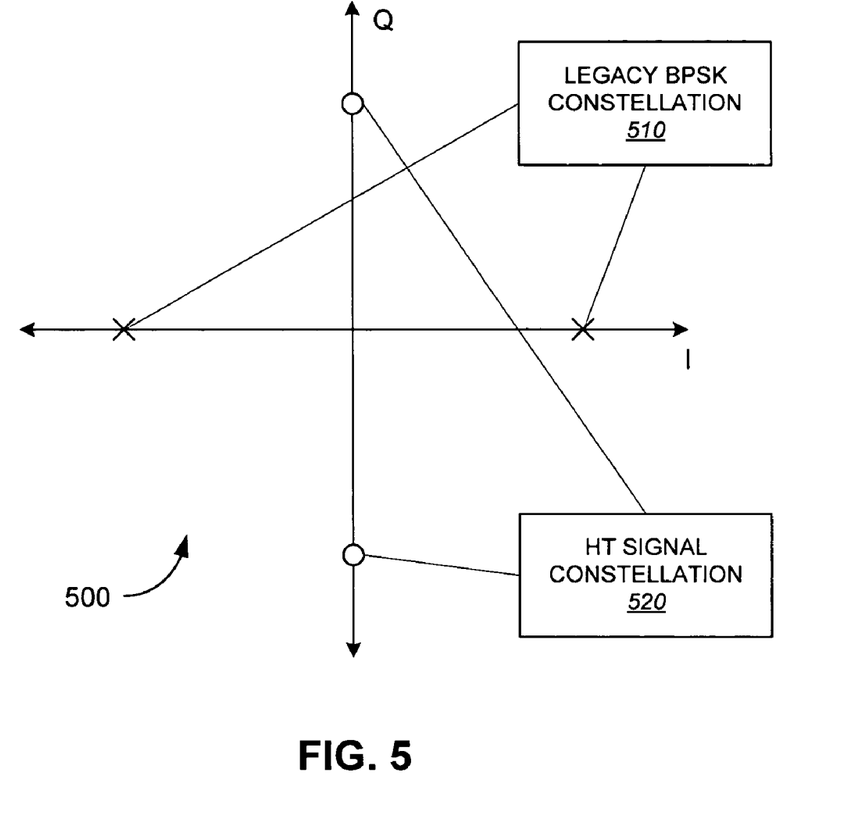
FIG. 5 depicts example embodiments of a constellation used to form a high throughput format indicator.

One method proposed for such an indicator in the TGnSync proposal is as follows. To allow 802.11n STAs to detect the presence of the Extension SIGNAL Field, the BPSK signal for the Extension SIGNAL field is transmitted with a 90-degree phase rotation, with respect to the legacy PLCP SIGNAL field. Example embodiments of a constellation for including a high throughput format indicator is depicted in FIG. 5. An 802.11n device will test two hypotheses: it will attempt to demodulate the constellation indicated in the SIGNAL Field, and at the same time will attempt to demodulate the BPSK constellation 90 degrees from its original.

After attempting to demodulate the two constellations in parallel, for a given length of the Extension SIGNAL Field, an 802.11n node will take the output of the 90 degree phase shifted BPSK constellation, decode the Extension SIGNAL field and check its CRC. If the CRC passes, it will recognize that this is an 802.11n PPDU and continue to decode the MAC Header using the True Rate and True Length specified in the Extension SIGNAL Field. If the CRC fails, it will recognize that it is a legacy PPDU and interpret the legacy MAC Header that it has been receiving. These two hypotheses may be tested in parallel. Moreover, other methods to test these hypotheses are possible, for example, using a matched filter or correlation detector and using energy thresholds to test the hypotheses.

A legacy user terminal will use the constellation 510 for legacy BPSK demodulation. A high throughput user terminal will use legacy BPSK constellation 510 as well as HT constellation 520, which is at a 90 degree phase shift, as described above. Those of skill in the art will recognize that various alternate constellations may be used to transmit one or more fields, for one or more segments of a PPDU, to be used as a high throughput indicator. One problem with spoofing legacy STAs in this manner is that it may result in unnecessary battery drain at the legacy STAs as they attempt to demodulate and decode these PPDUs.

Figure 6:
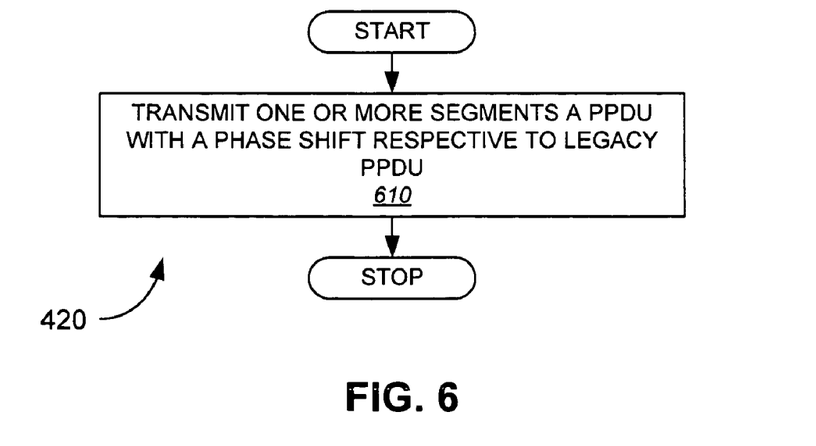
FIG. 6 depicts example embodiments of a method for transmitting a high throughput indicator.

FIG. 6 depicts example embodiments of a method for including a high throughput indicator in a backward compatible PPDU. At 610, suitable for deployment as 420 in FIG. 4, described above, a station transmits a PPDU with one or more segments having a phase shift (or other modulation format difference) respective to the legacy PPDU (such as PPDU 370, detailed above).

Figure 7:
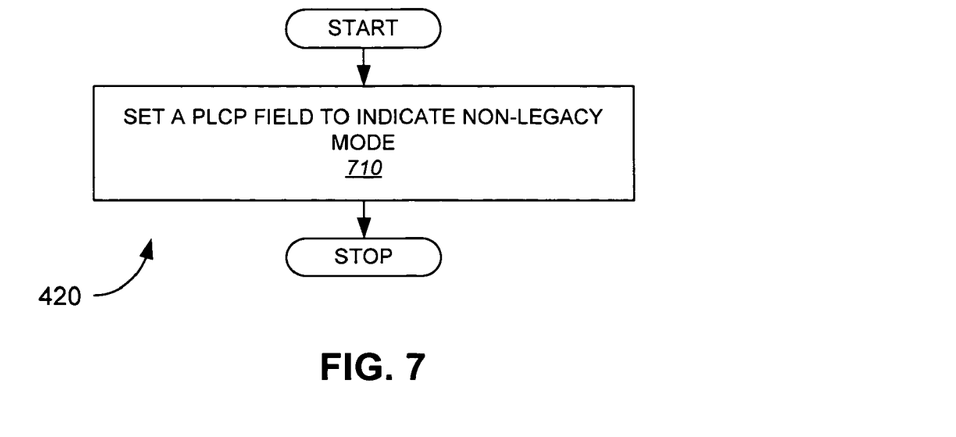
FIG. 7 depicts alternate example embodiments of a method for transmitting a high throughput format indicator.

In an alternate embodiment, unused values of the RATE field (or other field setting) may be used as the high throughput indicator. An alternate example high throughput format indicator is depicted in FIG. 7. At 710, a PLCP field is set to indicate non-legacy mode. This is suitable for deployment as step 420 in FIG. 4, described above. Various example field settings have been detailed herein, such as using a reserved bit or an unused rate or type in the rate field. Those of skill in the art will recognize that any field value may be modified to indicate non-legacy mode transmission.

In one embodiment, The RATE field in the SIGNAL field of the PLCP Header is modified to a RATE/Type field (as described in the aforementioned '330 application). Unused values of RATE are designated as PPDU Type. The PPDU Type also indicates the presence and length of a SIGNAL field extension, designated as SIGNAL2. Various PPDU Types may be defined, as will be apparent to those of skill in the art. These RATE/Type fields are undefined for legacy STAs. Therefore, upon successfully decoding the SIGNAL1 field and finding an undefined value in the RATE field, legacy STAs may abandon decoding of the remainder of the PPDU and attempt clear channel assessment (CCA) to determine when the medium becomes idle again.

Legacy STAs may use either energy detection or correlation with the front portion of the Preamble for CCA. Only a small fraction of receive processing complexity is required for CCA compared to PPDU demodulation and decoding, and thus the effects of spoofing would be correspondingly lower should a spoofed legacy terminal follow this course of action. Nonetheless, both of these example spoofing proposals result in unnecessary battery drain at legacy STAs. The second method, where undefined Rate values are used, may result in lower battery drain, as CCA circuitry consumes less current than the entire decoding chain at the legacy STA. So, as described above in FIG. 4, detecting spoofing (i.e. detecting a high throughput format indicator) may be desirable to avoid such current drain.

Figure 8:
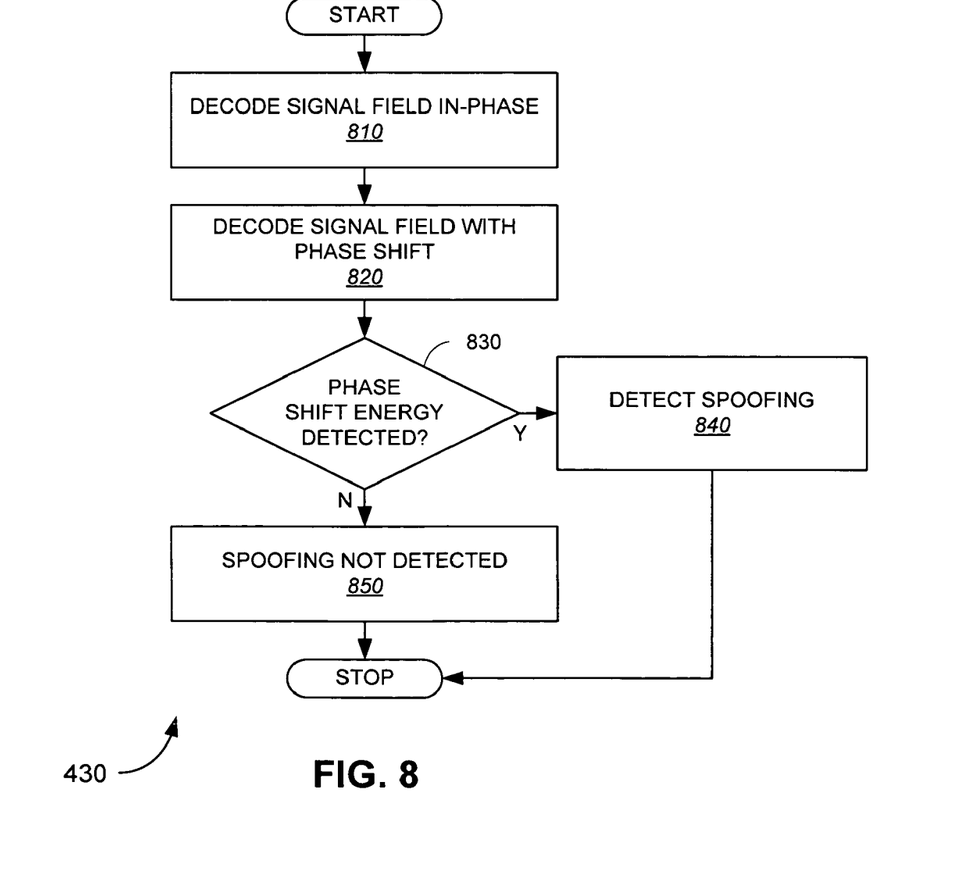
FIG. 8 depicts example embodiments of a method for detecting a high throughput format indicator.

FIG. 8 depicts example embodiments of a method 430 for detecting a high throughput format indicator. This method is suitable for use with high throughput format indicator techniques such as described above with respect to FIGS. 5 and 6. At 810, a user terminal decodes the signal field in a PLCP header using an in-phase, or legacy, constellation. At 820, user terminal decodes the signal field with a phase shift. As will be clear to one of skill in the art, any portion of the PLCP header, or PPDU, may be decoded to determine a phase shift (or other modulation format indicator).

At 830, if phase shift energy is detected, then spoofing is detected as shown at 840. If not, spoofing is not indicated, as shown in 850. Various techniques for detecting energy in one or more phases are well known in the art. Any one of these techniques may be deployed in any embodiment described herein. Note that the high throughput format indicator may be indicated by transmitting on both constellations 510 and 520, or on a single constellation, such as constellation 520.

In one embodiment, a reduced functionality user terminal may perform decoding in a similar matter to a high throughput device, as described above. For example, it may decode both constellations in parallel for a given length to determine an extension signal field, check the CRC, and then use the true rate and true length specified in the signal field. In an alternate embodiment, with a relatively lower user functionality user terminal, a simple energy detection in both phases and comparison thereof may be used to determine if spoofing is being deployed.

Figure 9:
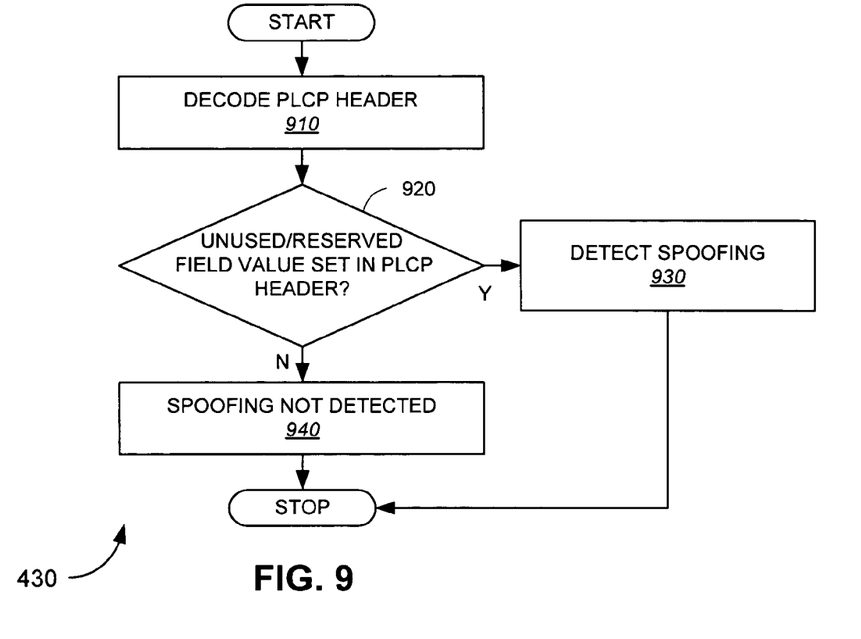
FIG. 9 depicts alternate embodiments of a method for detecting a high throughput format indicator.

FIG. 9 depicts alternate embodiments of a method 930 for detecting a high throughput format indicator. This method is suitable for use with high throughput format indicator techniques such as described above with respect to FIG. 7. At 910, the user terminal decodes the PLCP header using legacy procedures. At 920, if an unused or reserved field value is set in the PLCP header, proceed to 930, as spoofing is detected. If not, as shown in 940, spoofing is not detected. As described above, any field, including reserved bits, unused rates, unused types, and the like, may be used as a high throughput indicator and may be detected in step 920, as shown.

The user terminal embodiment deploying one or more aspects as detailed herein may wish to accommodate a spoofing attempt by remaining off the channel, as described above. Various techniques may be used to determine the proper duration for which a legacy or reduced functionality user terminal should remain inactive on the channel, as described above, with respect to step 440 in FIG. 4. Below are two examples of such techniques. These may be used with any type of high throughput indicator, as described above. In general, the rate and length field in the legacy signal field, may be used, as described above to determine the duration. Or, if so equipped, a reduced functionality user terminal may be designed to detect the presence of the rotated BPSK modulation, demodulate the Extension SIGNAL field, and determine the True Rate and True Length of the HT PPDU. It may thus determine the precise remaining duration of the PPDU rather than the spoofed duration indicated by the Rate and Length field values set in the legacy SIGNAL field. For the case in which an undefined Rate value is used, legacy STAs may similarly determine the format of the Extension SIGNAL field and decode it to determine the duration of the 802.11n PPDU.

Figure 10:
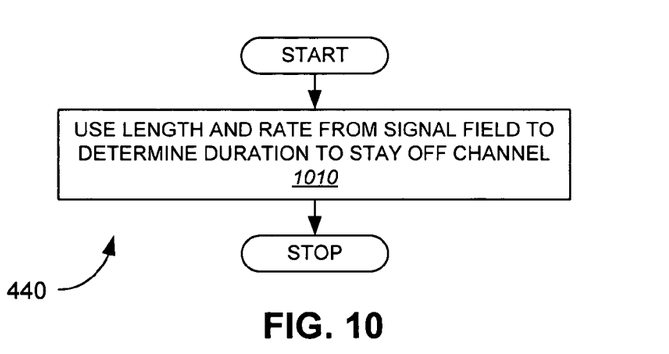
FIG. 10 depicts example embodiments of a method for determining a duration of a high throughput PPDU.

Example embodiments of a method 440 for determining the duration of a high throughput PPDU is shown in FIG. 10. In this example, the user terminal, at 440, will decode the duration of the high throughput PPDU from the signal field. There are a variety of techniques for including the duration of the PPDU in the signal field. For example, the rate and length, as described above, the product of which indicates time duration.

At 1010, the user terminal may use the length and rate from the SIGNAL field to determine the duration for which to stay off of the shared channel. This step 1010 is suitable for deployment as 440 in method 400, described above with respect to FIG. 4.

Figure 11:
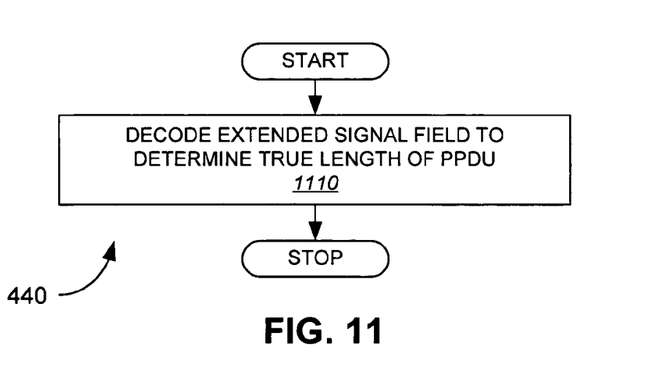
FIG. 11 depicts alternate embodiments of a method for decoding a duration of a high throughput PPDU.

FIG. 11 depicts alternate embodiments of a method for decoding the duration of a high throughput PPDU. 1110 is an alternate technique suitable for deployment as step 440 in method 400 detailed above. In this example, an extended SIGNAL field is included in the PPDU. This extended field may be incorporated in any portion of the PLCP header, or other portion of a PPDU. It may be transmitted using modulation formats and rates discernable by legacy stations, or may be transmitted using other formats. At 1110, the extended SIGNAL field is decoded to determine the true length of a PPDU. In various embodiments, reduced functionality user terminals may be deployed with varying levels of functionality. Thus, some reduced functionality user terminals may be equipped to receive at modulation formats other than those detailed in legacy standards. The terminal may be able to decode this information from the extended SIGNAL field and use that duration to refrain from accessing the shared channel.

In various embodiments, alternate steps (such as reducing backoff to avoid unfairness, entering low power states, performing alternate communication tasks, etc.) may be performed when spoofing is detected. Thus, in all these scenarios, the legacy STA can avoid unnecessary battery drain when the medium is occupied by 802.11n STAs whose transmissions it is unable to demodulate and decode.

Figure 12:
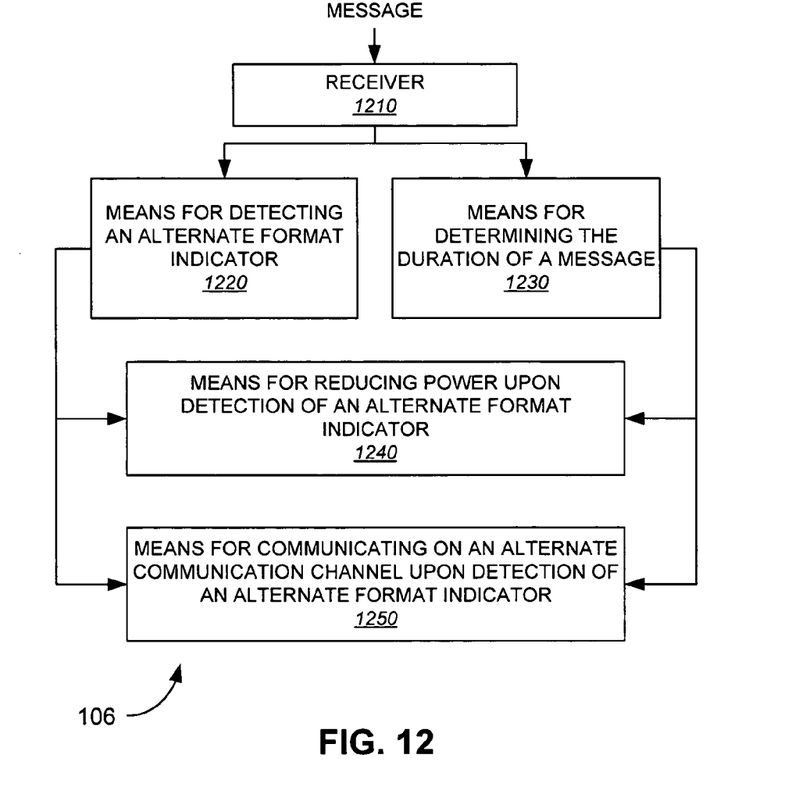
FIG. 12 depicts alternate embodiments of a wireless communication device.

FIG. 12 depicts alternate embodiments of a wireless communication device 106. A message is received at receiver 1210. Receiver 1210 may be any type of receiver known in the art, examples of which are described above. In this example, a first part of the message is transmitted in a first communication format. When a second part of the message is to be transmitted in a second communication format, the message also comprises an alternate format indicator, examples of which are described above. The received message is delivered to means for detecting an alternate format indicator 1220. Optionally, as shown, the received message may be delivered to means 1230 for determining the duration of the message. One or more additional blocks may also be included, if desired. For example, a means for reducing power upon detection of an alternate format indicator 1240 may be deployed. This means may operate in response to a detected alternate indicator as determined in means 1220. If a connection to means 1230 is deployed, the determined duration may also be used in determining how to reduce power, and/or for how long. Another example is means 1250 for communicating on an alternate communication channel upon detection of the alternate format indicator (i.e., from means 1220). Again, if means 1230 is deployed, and a connection to means 1250 is deployed, the determined duration may be used in determining how long and/or in what fashion the alternate communication should take place. Various other means may be deployed, examples of which are detailed herein, operable upon detection of an alternate format indicator.

Figure 13:
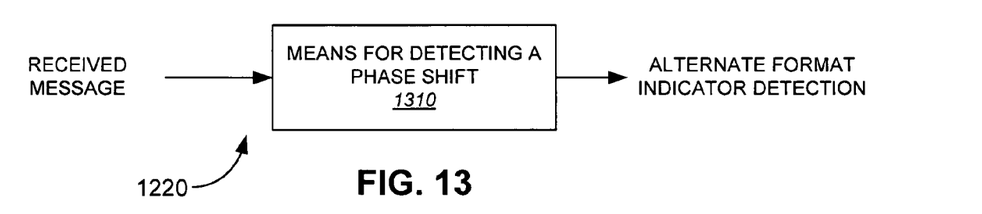
FIG. 13 depicts example embodiments of a means for detecting an alternate format indicator.
Figure 14:
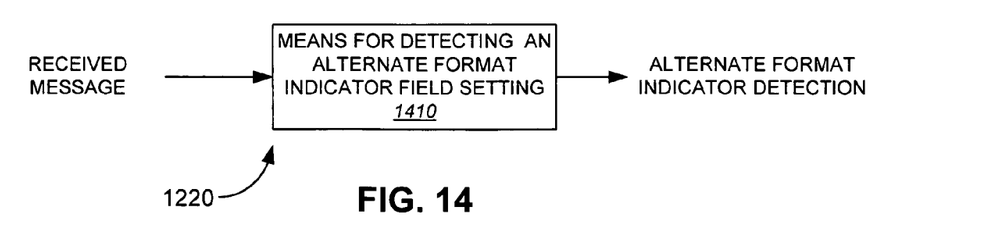
FIG. 14 depicts alternate example embodiments of a means for detecting an alternate format indicator.

FIG. 13 depicts example embodiments of a means for detecting an alternate format indicator 1220. In this example, a means 1310 for detecting a phase shift is deployed to detect an alternate format indicator from a received message. Examples for such a means are detailed above. FIG. 14 depicts alternate example embodiments of a means for detecting an alternate format indicator 1220. In this example, a means 1410 for detecting an alternate format indicator field setting is deployed to detect an alternate format indicator from a received message. Examples for such a means are also detailed above.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
   a receiver configured to receive a message, a first part of the message transmitted in a first communication format, the message comprising an alternate format indicator when a second communication format is used to transmit a second part of the message; and
   a processor configured to detect the alternate format indicator, determine a duration for transmission of the second part of the message when the alternate format indicator is detected, and direct the receiver to enter a low power state for the determined duration when the alternate format indicator is detected, wherein
   the message comprises one or more legacy fields and one or more extension fields; and
   the duration is determined from the one or more extension fields.

2. The apparatus of claim 1, wherein the alternate format indicator comprises a phase shift to part of the message.

3. The apparatus of claim 1, wherein the alternate format indicator is a field set in the message.

4. The apparatus of claim 1, further comprising a decoder configured to decode one or more fields in the message, wherein the processor determines the duration for remaining in the low power state in response to the one or more decoded fields.

5. An apparatus comprising:
   means for receiving a message, a first part of the message transmitted in a first communication format, the message comprising an alternate format indicator when a second communication format is used to transmit a second part of the message;
   means for detecting the alternate format indicator;
   means for determining a duration for transmission of the second part of the message when the alternate format indicator is detected; and
   means for entering a low power state for the determined duration when the alternate format indicator is detected, wherein
   the message comprises one or more legacy fields and one or more extension fields; and
   the duration is determined from the one or more extension fields.

6. The apparatus of claim 5, further comprising means for determining a duration of the message.

7. The apparatus of claim 5, further comprising means for reducing power upon detection of the alternate format indicator.

8. The apparatus of claim 5, further comprising means for communicating on an alternate communication channel upon detection of the alternate format indicator.

9. The apparatus of claim 5, wherein the means for detecting the alternate format indicator comprises a means for detecting a phase shift in the received message.

10. The apparatus of claim 5, wherein the means for detecting the alternate format indicator comprises a means for detecting an alternate format indicator field setting in the message.

11. A method comprising:
    receiving a message, a first part of the message transmitted in a first communication format, the message comprising an alternate format indicator when a second communication format is used to transmit a second part of the message;
    detecting the alternate format indicator;
    determining a duration for transmission of the second part of the message when the alternate format indicator is detected; and
    entering a low power state for the determined duration when the alternate format indicator is detected, wherein
    the message comprises one or more legacy fields and one or more extension fields; and
    the duration is determined from the one or more extension fields.

12. The method of claim 11, wherein the alternate format indicator is transmission of part of the message with a phase shift.

13. The method of claim 11, wherein the alternate format indicator is a field set in the message.

14. The method of claim 11, further comprising:
decoding one or more fields in the message; and
determining a duration for the remaining in the low power state in response to the one or more decoded fields.

15. The method of claim 14, wherein a first part of the message is transmitted in a first communication format, and a second part of the message is transmitted in a second communication format, the one or more fields for decoding transmitted in the second communication format in the second part of the message.

16. The method of claim 11, wherein at least one of the legacy fields is different that at least one of the corresponding extension fields.

17. The method of claim 11, wherein entering a low power state comprises disabling decoding of a channel.

18. The method of claim 11, wherein entering a low power state comprises disabling receiving of a channel.

19. The method of claim 11, wherein entering a low power state comprises monitoring an alternate communication channel, the alternate communication channel different from the communication channel on which the message was received.

20. The method of claim 11, wherein entering a low power state comprises modifying a backoff procedure for use after leaving the low power state.

21. A method comprising:
receiving a message, the message comprising a first part transmitted at a first phase and a second part transmitted at a second phase, the second phase different than the first phase;
detecting a phase difference between the first part and the second part;
entering a low power state when the phase difference is detected;
decoding one or more fields in the message; and
determining a duration for the remaining in the low power state in response to the one or more decoded fields.

22. The method of claim 21, wherein:
the message comprises one or more legacy fields and one or more extension fields; and
wherein the duration is determined from the one or more extension fields.

23. The method of claim 22, wherein at least one of the legacy fields is different that at least one of the corresponding extension fields.

24. The method of claim 21, wherein a first part of the message is transmitted in a first communication format, and a second part of the message is transmitted in a second communication format, the one or more fields for decoding transmitted in the second communication format in the second part of the message.

25. A method comprising:
receiving a message, a first part of the message transmitted in a first communication format, the message comprising one or more fields for setting parameters of the first communication format;
decoding the one or more fields; and
entering a low power state when a decoded field is set to a value unsupported by the first communication format.

26. The method of claim 25, wherein the one or more fields comprises a reserved bit.

27. The method of claim 25, wherein the one or more fields comprises a rate field.

28. The method of claim 25, wherein the one or more fields comprises a length field.

29. The method of claim 25, further comprising determining a duration for the remaining in the low power state in response to the one or more decoded fields.

30. The method of claim 29, wherein:
the message comprises one or more legacy fields and one or more extension fields; and
the duration is determined from the one or more extension fields.

31. The method of claim 30, wherein at least one of the legacy fields is different that at least one of the corresponding extension fields.

32. The method of claim 25, wherein a second part of the message is transmitted in a second communication format, and one or more of the one or more fields for decoding are transmitted in the second communication format in the second part of the message.

33. A processor-readable medium, comprising:
code for causing a processor to receive a message, a first part of the message transmitted in a first communication format, the message comprising an alternate format indicator when a second communication format is used to transmit a second part of the message;
code for causing a processor to detect the alternate format indicator;
code for causing a processor to determine a duration for transmission of the second part of the message when the alternate format indicator is detected; and
code for causing a processor to enter a low power state for the determined duration when the alternate format indicator is detected, wherein
the message comprises one or more legacy fields and one or more extension fields; and
the duration is determined from the one or more extension fields.

34. A processor-readable medium, comprising:
code for causing a processor to receive a message, the message comprising a first part transmitted at a first phase and a second part transmitted at a second phase, the second phase different than the first phase;
code for causing a processor to detect a phase difference between the first part and the second part;
code for causing a processor to enter a low power state when the phase difference is detected;
code for causing a processor to decode one or more fields in the message; and
code for causing a processor to determine a duration for the remaining in the low power state in response to the one or more decoded fields.

35. A processor-readable medium, comprising:
code for causing a processor to receive a message, a first part of the message transmitted in a first communication format, the message comprising one or more fields for setting parameters of the first communication format;
code for causing a processor to decode the one or more fields; and
code for causing a processor to enter a low power state when a decoded field is set to a value unsupported by the first communication format.

* * * * *

UNITED STATES PATENT AND TRADEMARK OFFICE
CERTIFICATE OF CORRECTION

PATENT NO.      : 7,590,078 B2  Page 1 of 1
APPLICATION NO. : 11/243554
DATED           : September 15, 2009
INVENTOR(S)     : Sanjiv Nanda It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 353 days.

Signed and Sealed this

Twenty-first Day of September, 2010

David J. Kappos
*Director of the United States Patent and Trademark Office*